United States Patent [19]

Furuta

[11] 4,340,917
[45] Jul. 20, 1982

[54] BACK SPACING APPARATUS

[75] Inventor: Kenzi Furuta, Hachioji, Japan

[73] Assignee: Olympus Optical Co., Ltd., Tokyo, Japan

[21] Appl. No.: 145,735

[22] Filed: May 1, 1980

[30] Foreign Application Priority Data

May 15, 1979 [JP] Japan ................................. 54-59485

[51] Int. Cl.³ ............................................. G11B 15/20
[52] U.S. Cl. ..................................... 360/74.2; 360/25
[58] Field of Search ..................... 360/73, 74.1, 74.2, 360/13; 369/24, 25; 318/7

[56] References Cited

U.S. PATENT DOCUMENTS

| | | | |
|---|---|---|---|
| 3,758,726 | 9/1973 | Bolick et al. | 369/24 |
| 4,000,514 | 12/1976 | Fukatsu | 360/74.2 X |
| 4,160,195 | 7/1979 | Sakamoto | 318/7 |
| 4,170,029 | 10/1979 | Kahn | 360/73 X |
| 4,224,646 | 9/1980 | Schatteman | 360/74.2 |

FOREIGN PATENT DOCUMENTS 2743644 3/1978 Fed. Rep. of Germany .
2020471 11/1979 United Kingdom ............... 360/74.2

Primary Examiner—Stuart N. Hecker
Attorney, Agent, or Firm—Frishauf, Holtz, Goodman and Woodward

[57] ABSTRACT

A back spacing apparatus includes a first means for providing speed information (E3, E4) corresponding to the speed of a tape, a drive source for rewinding the tape toward a supply reel (24) for back spacing, and a second means for providing an amount of electrical energy corresponding to the speed information (26) to the drive source (26) so that a length of the tape over which it is rewound toward the supply reel for back spacing is changed according to the transporting speed of the tape. The magnitude of the electrical energy is changed according to the speed information of the tape so that an amount of memory contents on that portion of a recorded tape rewound toward the supply reel for back spacing is made substantially independent of the transporting speed of the tape.

10 Claims, 3 Drawing Figures

BACK SPACING APPARATUS

BACKGROUND OF THE INVENTION

This invention relates to a back spacing apparatus for a tape player for use with a dictating transcriber machine, in which a tape is automatically rewound a predetermined amount for back spacing when the player is switched from a reproduce mode to a stop mode.

When information recorded on a tape is transcribed, if there is a passage difficult to catch or follow, it is necessary to first stop the tape and then listen to it again by rewinding the tape to some extent and reproducing it. It is therefore necessary for the typist to effect the rewinding and playback operations of the tape each time any passage difficult to catch is encountered. Such a cumbersome operation is required in a case where typing, once interrupted for urgent business, is continued.

In order to solve the above-mentioned inconvenience a back spacing apparatus for automatically rewinding a tape is currently used. For example, Japanese Patent publication No. 11211/77 or Japanese Patent Disclosure No. 71304/75 discloses a technique relating to such a back spacing apparatus. It is desirable that an amount of memory contents on that portion of a recorded tape rewound for back spacing be made substantially constant irrespective of the tape running or transporting speed at the time of playback. For a tape speed of either 2.4 cm/s or 1.2 cm/s it is desirable that a length of a tape over which it is rewound for back spacing correspond to about one to two words (one to three seconds) of a normal conversation. In the conventional back spacing apparatus, however, no particular consideration is paid to the rewinding of the tape over a predetermined length with respect to a change in tape speed. That is, in the conventional back spacing apparatus the tape is rewound a fixed amount for back spacing irrespective of the tape transporting speed. For this reason, an amount of memory contents on that portion of a recorded tape rewound for back spacing varies dependent upon the speed at which the tape is recorded. Suppose, for example, that use is made of an apparatus adapted to rewind a recorded tape amount corresponding to a playback time of 2 seconds at a tape speed of 2.4 cm/s so as to present a corresponding amount of memory contents on the recorded tape.

In this case, if a tape is recorded at a speed of 1.2 cm/s it follows that the recorded tape is rewound for back spacing so as to present those memory contents on the recorded tape which correspond to about 4 seconds. The longer the time during which said memory contents are reproduced, the lower the typing efficiency. In an apparatus adapted to rewind a recorded tape for back spacing so as to present an amount of memory contents on the recorded tape corresponding to 2 seconds at a tape speed of 1.2 cm/s, it follows that the tape is rewound an amount corresponding to only one second for back spacing, compared with the case where the tape speed is 2.4 cm/s. In this case, the head or beginning of the backspaced word tends to be mutilated since a length of the tape over which the tape is so rewound is insufficient.

SUMMARY OF THE INVENTION

It is accordingly an object of this invention to provide a back spacing apparatus capable of automatically rewinding a recorded tape for back spacing so as to present a corresponding amount of memory contents thereon irrespective of tape transporting speed at the recording.

In order to attain the above-mentioned object the back spacing apparatus of this invention includes a means for varying a length of a tape over which it is rewound, according to the transporting speed of the tape. Even if there is a variation in an amount of memory contents on a unit length of the tape, an amount of memory contents presented on the tape when it is automatically rewound for back spacing can be held in a predetermined range.

DETAILED DESCRIPTION OF THE PREFERRED EMBODIMENT

Figure 1:
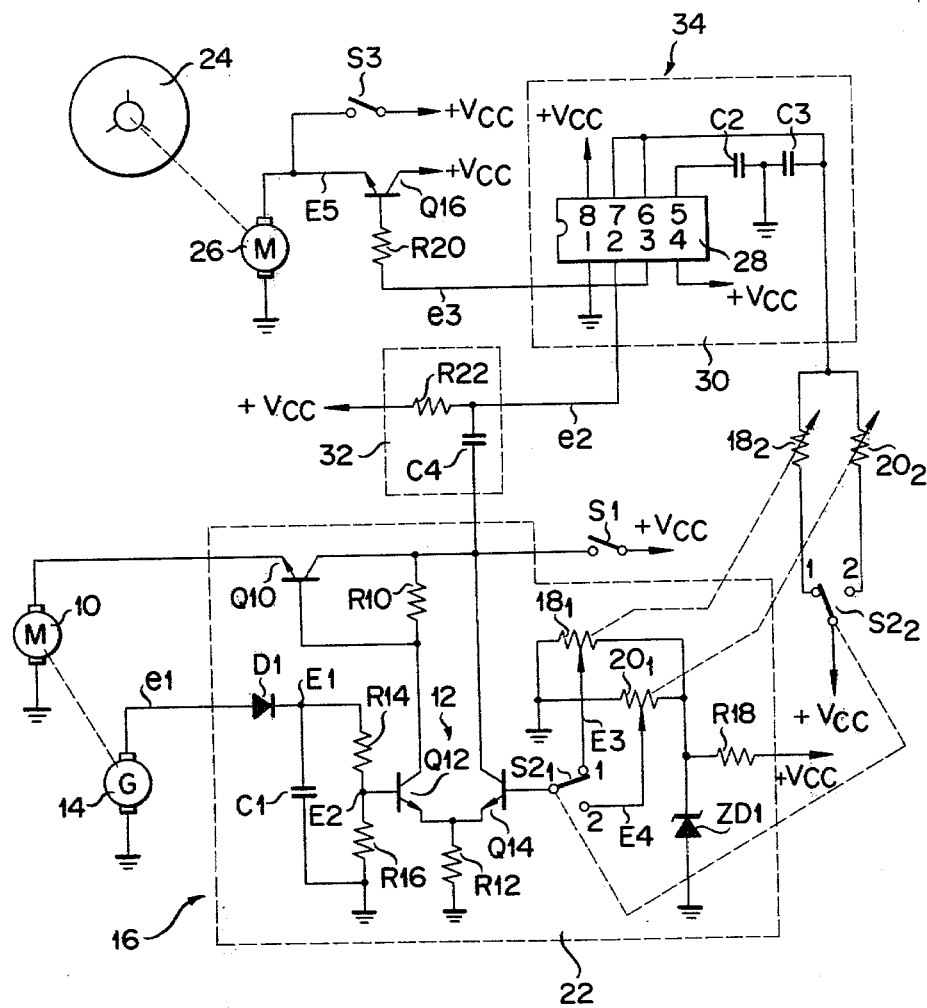
FIG. 1 shows a circuit diagram of a back spacing apparatus according to one embodiment of this invention.

Referring to FIG. 1, a capstan motor 10 is incorporated in a tape deck mechanism not shown and adapted to rotate a capstan of the deck at a predetermined rotation speed. Such a tape deck mechanism is disclosed in Japanese Patent Application No. 59487/79 filed on May 15, 1979 by the same assignee as that of this application. Japanese Patent Application No. 59487/79 corresponds to U.S. Application Ser. No. 148,500, filed May 9, 1980, assigned to the same Assignee as the present application. The motor 10 is grounded at one end and connected at the other end to the emitter of an NPN transistor Q10. The collector of the transistor Q10 is connected to a power supply +Vcc through a switch S1 and the base of the transistor Q10 is connected through a resistor R10 to the collector of the transistor Q10. The base of the transistor Q10 is also connected to the collector of an NPN transistor Q12 and the emitter of the transistor Q12 is connected to the emitter of an NPN transistor Q14. The emitters of the transistors Q12 and Q14 are grounded through a resistor R12. The collector of the transistor Q14 is connected to the collector of the transistor Q10. The transistors Q12 and Q14 constitute a comparator 12.

A generator 14 is coupled with the motor 10 and has its one end grounded. An AC voltage signal is proportional to the rotation speed of the motor 10 is generated at the other end of the generator 14. The signal e1 is supplied to one end of the capacitor C1 through an anode-to-cathode path of a diode D1. The other end of the capacitor C1 is grounded. That is, the signal e1 is rectified by the diode D1 and smoothed out (ripple-eliminated) by the capacitor C1. A DC voltage E1 proportional to the rotation speed of the motor 10 is developed at the cathode of the diode D1. The voltage E1 is divided at a voltage dividing point between resistors R14 and R16 into a voltage E2. The voltage E2 is applied to the base of the transistor Q12.

A comparison or reference voltage E3 (or E4) is applied through a two-gang two-contact switch S2₁ to the base of the transistor Q14. The comparator 12 compares a reference voltage E3 with the voltage E2. When E2<E3, the collector current of the transistor Q12 is decreased and the emitter voltage of the transistor Q10 is increased, causing the rotation speed of the motor 10 to be increased to permit the voltage E2 to be increased. When, on the other hand, E2>E3 the collector current of the transistor Q12 is increased and the emitter voltage of the transistor Q10 is decreased, causing the rotation speed of the motor 10 to be decreased to permit the voltage E2 to be decreased. Eventually, the rotation speed of the motor 10 is controlled such that the voltages E2 and E3 become almost equal to each other. The motor 10 drives the capstan, not shown, for transporting the tape at a constant speed. For this reason, the rotation speed of the motor 10 is proportional to the transporting speed of the tape. In other words, the comparison voltage E3 (or E4) applied to the base of the transistor Q14 is converted to speed information corresponding to the transporting speed of the tape.

The comparison voltage E3 is derived from a slider of a two-gang type variable resistor $18_1$ and supplied to the base of the transistor Q14 through a first terminal of the switch $S2_1$. The comparison voltage E4 is derived from a slider of a two-gang type variable resistor $20_1$ and supplied through a second terminal of the switch $S2_1$ to the base of the transistor Q14. The variable resistors $18_1$ and $20_1$ are grounded at their one end and connected at their other end to the cathode of a zener diode ZD1. The anode of the zener diode ZD1 is grounded and the cathode of the zener diode ZD1 is connected through a resistor R18 to the power supply +Vcc. The transistors Q10 to Q14, resistors R10 to R18, diode D1, capacitor C1, zener diode ZD1, variable resistors $18_1$ and $20_1$ and switch $S2_1$ constitute a motor control circuit 22 for controlling the rotation of the capstan motor 10.

A reel motor 26 is coupled with a supply reel 24 of the tape deck. The motor 26 is also connectable to a take up reel not shown and adapted to be operated at the time of tape rewinding and fast forward. The motor 26 is coupled with the reel 24 during the rewind operation for back spacing. That is, the motor 26 provides a rewind drive source. The motor 26 has its one end grounded and its other end connected to the power supply +Vcc through a switch S3. The switch S3 is rendered ON at the time of normal rewinding and fast forward mode and OFF when a rewinding operation is effected for back spacing. The other end of the motor 26 is also connected to the emitter of an NPN transistor Q16. The collector of the transistor Q16 is connected to the power supply +Vcc and the base of the transistor Q16 is connected through a resistor R20 to a third pin of a timer IC 28. As the IC 28 use may be made of, for example, a MODEL NE 555 of Texas Instruments Inc. Ltd. A first pin of the IC 28 is grounded and fourth and eighth pins are connected to the power supply +Vcc. The fifth pin is grounded through a capacitor C2 and sixth and seventh pins are grounded through a capacitor C3. The sixth and seventh pins are connected respectively through variable resistors $18_2$ and $20_2$ to first and second terminals of a switch $S2_2$. A contact terminal of the switch $S2_2$ is connected to the power source +Vcc. The variable resistors $18_1$ and $18_2$, and $20_1$ and $20_2$, are ganged or in interlock with each other and the switches $S2_1$ and $S2_2$ also in interlock with each other.

The IC 28 and capacitors C2 and C3 constitute a monostable multivibrator 30. The time constant of the multivibrator 30 can be changed according to the product of the capacitor C3 and variable resistor $18_2$ or $20_2$. The multivibrator 30 is triggered when a negative trigger pulse e2 is supplied to the second pin of the IC 28, causing an output signal e3 derived from the third pin of the IC 28 to become a high level. The high level of the signal e3 is sustained according to the time corresponding to the time constant ($C3 \times 18_2$ or $C3 \times 20_2$). The second pin of the IC 28 is connected to the power supply +Vcc through a resistor R22, and through a capacitor C4 to the collector of the transistor Q10. The resistor R22 and capacitor C4 constitute a differentiation circuit 32.

Figure 2:
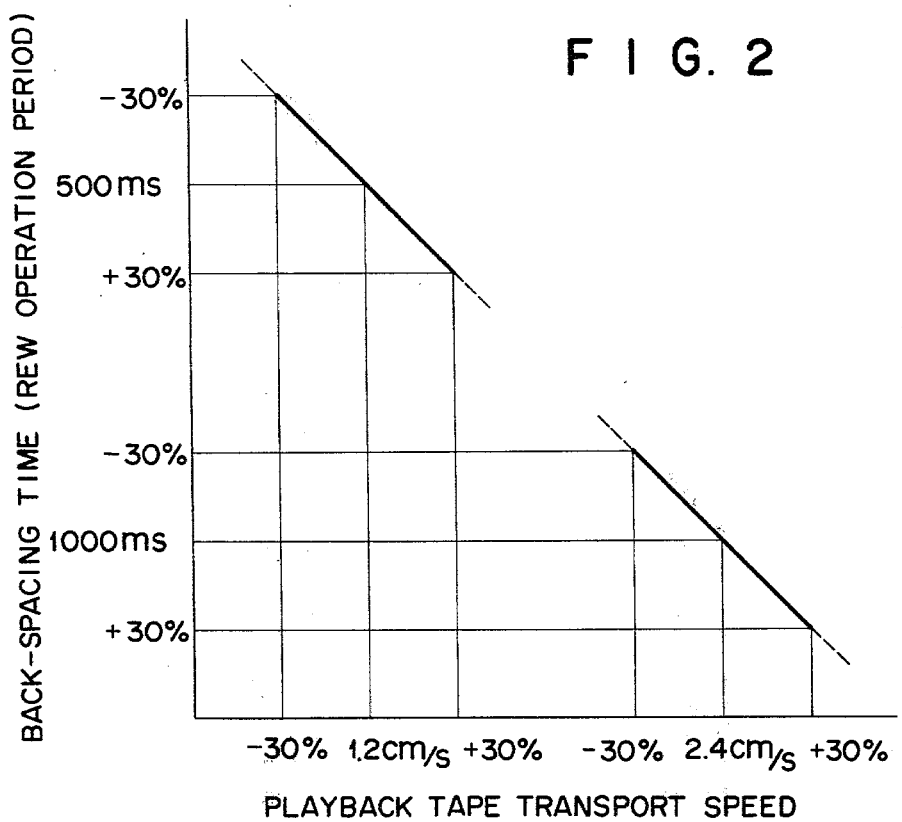
FIG. 2 is a graph for explaining the operation of the apparatus shown in FIG. 1.

Suppose that the switch S1 is rendered OFF with the tape deck switched from a reproduce mode to a stop mode. Since in this case the collector voltage of the transistor Q10 is decreased to zero, negative trigger pulse e2 is applied to the second pin of the IC 28. As a result, the multivibrator 30 is triggered and a high level signal e3 is supplied, during the time corresponding to the above-mentioned time constant, to the base circuit of the transistor Q16, causing a DC voltage signal E5 corresponding to the level of the signal e3 to be developed at the emitter of the transistor Q16. The reel 24 is rotated by the motor 26 and an automatic tape rewinding operation i.e. a back spacing operation is carried out. The rotation speed of the motor 26 during the back spacing operation is proportional to the voltage E5, and the back spacing operation time is proportional to the time during which the signal e3 sustains its high level. That is, the back spacing operation time is proportional to the time constant of the multivibrator 30. In other words, a length of the tape over which it is rewound toward the supply reel 24 is proportional to the time constant of the multivibrator 30. An electrical energy supplied to the motor 26 for rewinding is proportional to the product of the voltage E5 and the time constant of the multivibrator 30 or the period in which the motor 26 is powered. As mentioned above, the variable resistors $18_1$ and $18_2$ or $20_1$ and $20_2$ are in interlock with each other and in consequence the time constant of the multivibrator 30 corresponds to the comparison voltage E3 or E4 corresponding to the above-mentioned speed information. In order that an amount of memory contents on that portion of the recorded tape rewound a given distance for back spacing is made substantially independent of the transporting speed of the tape, the above-mentioned electrical energy is modified according to the above-mentioned speed information, as will be explained later. Suppose that the transporting speed of the tape is 1.2 cm/s with the switches S1 and S2 on the first contact side and that as shown in FIG. 2 the back spacing time required for the tape to be rewound when the transporting speed of the tape is 1.2 cm/s is adjusted to, for example, 500 ms. When in this case the slider of the variable resistor $18_1$ is moved so as to increase the tape speed to 1.2 cm/s+30%, the resistive value of the variable resistor $18_2$ is 30% increased, causing the time constant of the multivibrator 30 to be 30% increased to permit the back spacing time to be 30% lengthened. When, on the other hand, the tape transporting speed is reduced to 1.2 cm/s−30%, the back spacing time is 30% shortened. If the tape transporting speed becomes 2.4 cm/s with the switches S1 and S2 on the second contact side, the same result is obtained. In this case, the time constant of the multivibrator 30 is set to two times as much as that when the tape transporting speed is 1.2 cm/s.

As evident from the above-mentioned explanation, since the back spacing time can be extended in proportion to the tape transporting speed, an amount of memory contents on that portion of the recorded tape rewound automatically for back spacing can be made substantially constant irrespective of the tape transporting speed.

Figure 3:
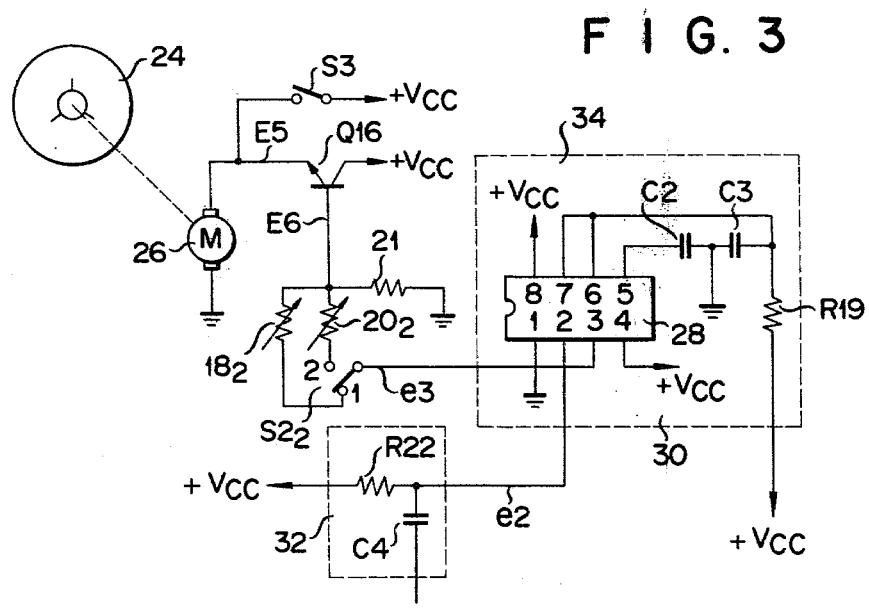
FIG. 3 shows a modified form of the circuit of FIG. 1.

Although this invention has been explained in connection with the embodiment in which the ratio between the tape transporting speed and the back spacing (rewinding) time is constant. On the other hand, as shown in FIG. 3, with the fixed time constant ($C3 \times R19$) of the multivibrator 30 a voltage E6 proportional to the comparison voltage (E3 or E4) applied to the base of the transistor Q14 (FIG. 1) may be supplied to the motor 26. That is, when the tape transporting speed is fast, for example, the comparison voltage E3 is high. At this time, the voltage E6 becomes higher and a voltage supplied to the motor 26 for back spacing becomes higher. Though in this case the time for the motor 26 to be conducted is constant, the rotation speed of the motor 26 is increased according to the increase of the voltage E5. That is, the voltage E6 can be varied by changing a voltage dividing ratio of a voltage dividing circuit ($18_2 + 21$) or a voltage dividing circuit ($20_2 + 21$). These voltage dividing ratios are varied according to the variable resistor $18_2$ or $20_2$. That is, when the tape transporting speed is faster, the tape rewinding speed becomes faster. It is therefore possible to maintain constant an amount of memory contents on that portion of the tape rewound for back spacing, irrespective of the tape transporting speed.

This invention is not restricted to the embodiments as disclosed in the instant specification and drawings, and can be varied in a variety of ways without departing from the spirit and scope of this invention. For example, this invention can also be applied to a one-motor type tape deck in which a motor is used not only as a reel motor but also as a capstan motor. It is also possible to provide a pulse generator for generating a pulse corresponding to the rotation of the capstan flywheel as shown, for example, in U.S. Pat. No. 4,001,552, to detect the pulse width of an output pulse derived from the pulse generator and corresponding to the rotation speed of the capstan and to automatically vary the values of the ganged variable resistors $18_1$ and $18_2$ or $20_1$ and $20_2$. Or a voltage E5 applied to the motor 26 may be changed during the back spacing time according to the above-mentioned pulse width. As a motor control circuit 22 use may be made of a commercially available speed regulator IC, for example, a MODEL TCA 955 of Siemens Co., Ltd. (West Germany). Though various applications are disclosed in the Application Note of TCA 955, it is only necessary that the reference level (E3, E5) for servo control be changed according to the tape speed whatever application is used in this case.

What is claimed is:

1. A back spacing apparatus for a multispeed tape player which transports tape at at least two given speeds between a supply reel and a take-up reel, comprising:
   motor means responsive to tape transporting speed information for selectively transporting a tape with one of said at least two given speeds;
   first means coupled to said motor means for generating said speed information which is a function of the transporting speed of the tape, said speed information designating a given one of said at least two given tape transport speeds;
   drive source means for rewinding said tape toward said supply reel; and
   second means coupled to said first means and to said drive source means for generating an amount of electrical energy which corresponds to said speed information and for coupling said amount of electrical energy to said drive source means to effect a back space rewinding of said tape toward said supply reel over a given length of said tape, the rewound tape length for back spacing being a function of said amount of electrical energy so that an amount of the recorded contents of said tape rewound onto said supply reel is substantially independent of the transporting speed of the tape which is designated by said speed information.

2. The apparatus of claim 1, wherein said second means includes means for providing a voltage having a magnitude which is proportional to said speed information to said drive source means, said second means including means responsive to said speed information to vary said voltage magnitude such that the ratio between the transporting speed of the tape and the speed at which the tape is rewound toward said supply reel for back spacing is substantially constant.

3. The apparatus of claim 2, wherein said second means includes a voltage divider circuit whose voltage dividing ratio is changed as a function of said speed information to thereby change the magnitude of said voltage.

4. The apparatus of claim 1, wherein said second means includes means for providing electrical power to said drive source means during a time period which is proportional to said speed information, said second means including time period varying means responsive to said speed information to vary said time period during which said power is provided to said drive source means such that the ratio between the transporting speed of the tape and the time period during which the tape is rewound toward the supply reel for back spacing is substantially constant.

5. The apparatus of claim 4, wherein said time period varying means of said second means includes a monostable multivibrator circuit whose time constant is varied as a function of said speed information to thereby change said amount of said electrical energy.

6. The apparatus of any one of claims 1, 2, 3, 4 or 5, including means for generating a trigger when the tape is rewound, and wherein said second means includes a monostable multivibrator which is triggered by said trigger when the tape is rewound, said monostable multivibrator providing a timing for generating said electrical energy only during a predetermined time after said triggering is effected.

7. The apparatus of any one of claims 1, 2, 3, 4 or 5, wherein said drive source means includes a motor, and the apparatus further comprises switch means coupled to connect said second means to the motor when a back spacing operation is effected and to connect the motor to a predetermined power supply when no back spacing operation is effected.

8. The apparatus of claim 6, wherein said drive source means includes a motor, and the apparatus further comprises switch means coupled to connect said second means to the motor when a back spacing operation is effected and to connect the motor to a predetermined power supply when no back spacing operation is effected.

9. In a back spacing apparatus comprising a first means for providing speed information corresponding to the transporting speed of a tape; a drive source means for rewinding the tape toward a supply reel; and a second means for providing electrical energy to said drive source means for rewinding tape toward said supply reel, the improvement wherein:

said second means provides said electrical energy for rewinding in an amount corresponding to said speed information so that a length of the tape over which it is rewound toward the supply reel for back spacing is changed as a function of the transporting speed of the tape, the magnitude of said amount of electrical energy which is provided from said second means being changed as a function of said speed information so that an amount of memory contents on that portion of a recorded tape rewound toward said supply reel for back spacing is substantially independent of said transporting speed of the tape.

10. The apparatus of claim 9, wherein said second means includes means responsive to said speed information to vary the magnitude of said amount of electrical energy such that the ratio between the transporting speed of the tape during recording and the amount of tape which is rewound during said backspacing is substantially constant.

* * * * *